UNITED STATES PATENT OFFICE.

JOHN W. JONES, OF FAYETTEVILLE, TENNESSEE.

LINIMENT.

SPECIFICATION forming part of Letters Patent No. 422,946, dated March 11, 1890.

Application filed November 7, 1889. Serial No. 329,591. (No specimens.)

*To all whom it may concern:*

Be it known that I, JOHN W. JONES, a citizen of the United States, residing at Fayetteville, in the county of Lincoln and State of Tennessee, have invented certain new and useful Improvements in Liniments; and I do hereby declare that the following is a full, clear, and exact description of the same.

This invention relates to certain new and useful improvements in liniments; and it has for its object to provide a liniment that shall be an excellent remedy in cases of sore throat, diphtheria, sore chest or bowels, and any acute pains in the hips or back, fresh cuts, bruises, or sprains.

The novelty resides in the combination of the following ingredients, in substantially the proportions hereinafter specified: I take of kerosene-oil one pint; turpentine, (spirits,) one pint; gum-camphor, one ounce; oil of tar, one ounce; oil of origanum, one ounce.

I first put the gum-camphor into the turpentine, then put in the kerosene-oil and mix the three together, then add the oil of origanum and the oil of tar, and agitate thoroughly.

A liniment prepared as above described has been found from experience to be very beneficial and efficacious in throat diseases, sorts of acute pains, cuts, bruises, and sprai

What I claim as new is—

A liniment composed of kerosene-oil, spirits of turpentine, gum-camphor, oil of tar, and oil of origanum, in substantially the proportions specified.

In testimony that I claim the above I have hereunto subscribed my name in the presence of two witnesses.

JOHN W. JONES.

Witnesses:
 GEO. W. HIGGINS,
 W. N. WHITAKER.